(12) United States Patent
Itkin et al.

(10) Patent No.: US 12,231,585 B2
(45) Date of Patent: Feb. 18, 2025

(54) MULTI-DESTINATION CHALLENGE-RESPONSE SECURITY TOKENS

(71) Applicant: MELLANOX TECHNOLOGIES, LTD., Yokneam (IL)

(72) Inventors: Yuval Itkin, Zoran (IL); Michael Tahar, Yavne (IL); Haim Kupershmidt, Or-Yehuda (IL); Ameer Mahagneh, Umm Al-Fahm (IL)

(73) Assignee: Mellanox Technologies, Ltd, Yokneam (IL)

( * ) Notice: Subject to any disclaimer, the term of this patent is extended or adjusted under 35 U.S.C. 154(b) by 316 days.

(21) Appl. No.: 17/745,906

(22) Filed: May 17, 2022

(65) Prior Publication Data

US 2023/0379172 A1 Nov. 23, 2023

(51) Int. Cl.
*H04L 9/32* (2006.01)
(52) U.S. Cl.
CPC .......... *H04L 9/3271* (2013.01); *H04L 9/3213* (2013.01); *H04L 9/3247* (2013.01)
(58) Field of Classification Search
CPC ......... H04L 9/3213; H04L 9/321; H04L 9/32; H04L 9/3271; H04L 9/3297
See application file for complete search history.

(56) References Cited

U.S. PATENT DOCUMENTS

| | | | |
|---|---|---|---|
| 2009/0205028 A1 | 8/2009 | Smeets et al. | |
| 2009/0217043 A1 | 8/2009 | Metke et al. | |
| 2009/0234986 A1 | 9/2009 | Yuhara et al. | |
| 2011/0307694 A1* | 12/2011 | Broustis | H04L 63/0884 713/169 |
| 2016/0259667 A1 | 9/2016 | Bailey et al. | |
| 2017/0177457 A1 | 6/2017 | Swanson et al. | |
| 2018/0081698 A1 | 3/2018 | Byon et al. | |
| 2018/0165480 A1 | 6/2018 | Raju | |
| 2019/0361073 A1* | 11/2019 | Trantham | G06F 11/3656 |
| 2021/0099292 A1 | 4/2021 | Gilto et al. | |
| 2022/0052849 A1 | 2/2022 | Kasso et al. | |
| 2022/0113915 A1 | 4/2022 | Ki et al. | |

OTHER PUBLICATIONS

Advanced Micro Devices, Inc., "Magic Packet Technology", White Paper, pp. 1-6, year 1998.
Nvidia Corporation, "Nvidia Bluefield—3 DPU, Programmable Data Center Infrastructure On-A-Chip", Product Information, pp. 1-2, year 2021.

(Continued)

*Primary Examiner* — Olugbenga O Idowu
(74) *Attorney, Agent, or Firm* — Meitar Patents Ltd.; Daniel Kligler

(57) ABSTRACT

In one embodiment, a secure challenge-response method includes requesting respective token challenges from devices, receiving the respective token challenges from the devices, providing the respective token challenges to a signing server, receiving from the signing server a signature of the respective token challenges signed with a private key of the signing server, and providing to a given device of the devices a request to perform an operation, the request including the signature and the respective token challenges.

24 Claims, 6 Drawing Sheets

(56) References Cited

OTHER PUBLICATIONS

ARM, "Microprocessor Cores and Processor Technology—Processor IP for the Widest Range of Devices," p. 1-5, ARM Limited, years 1995-2022, as downloaded from https://www.arm.com/products/silicon-ip-cpu.
"Common Management Interface Specification (CMIS)", Rev. 5.0, pp. 1-300, May 8, 2021.
STMicroelectronics, "STSAFE—A110 Authentication, State-Of-The-Art Security for Peripherals on IoT Devices" Datasheet, pp. 1-36, Dec. 2019.
STMicroelectronics, M2646, "Getting Started with the X-CUBE-SAFEA1 Software Package", User Manual, pp. 1-23, year 2022.
Itkin, U.S. Appl. No. 17/694,725, filed Mar. 15, 2022.
U.S. Appl. No. 17/694,725 Office Action dated May 2, 2024.

\* cited by examiner

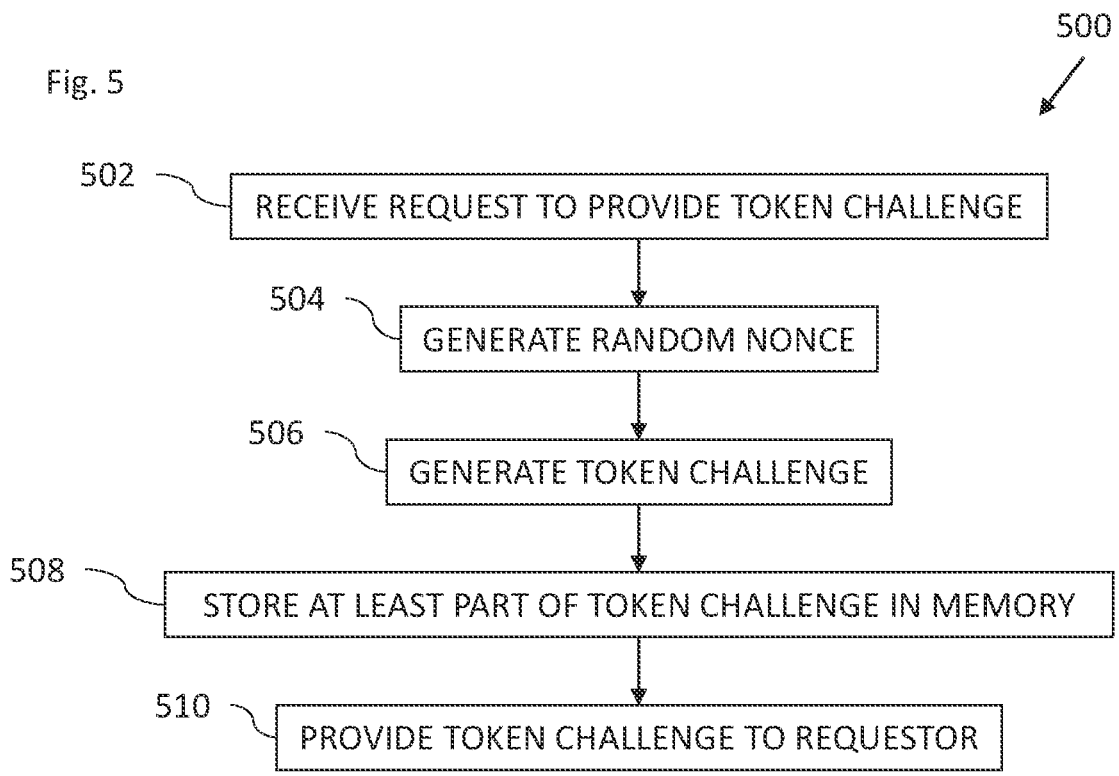
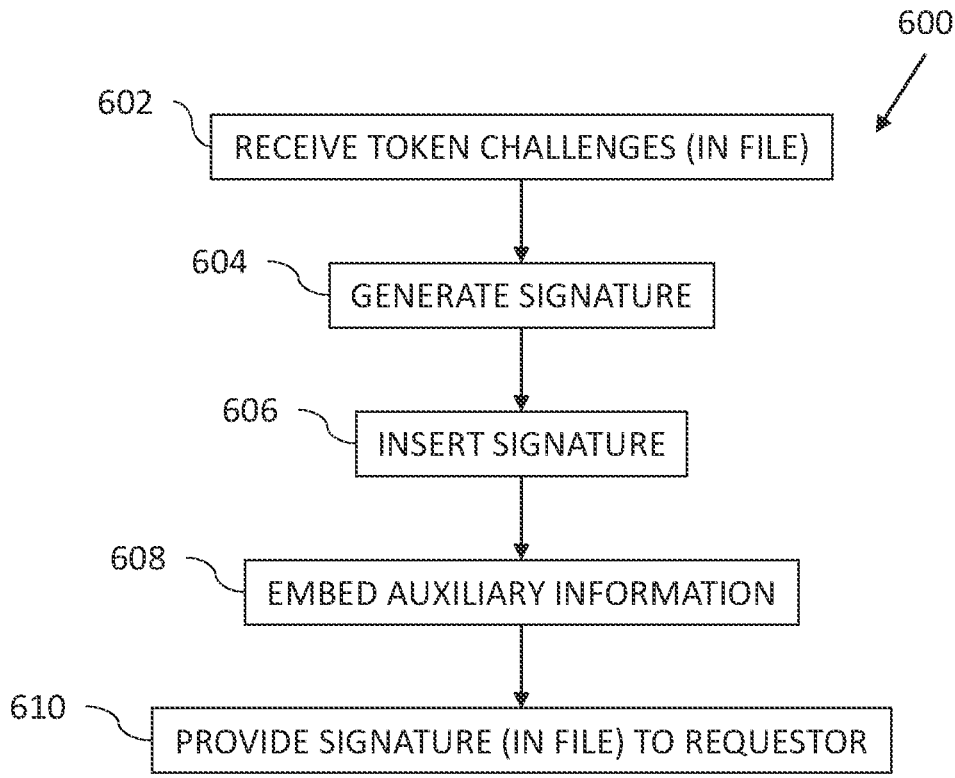

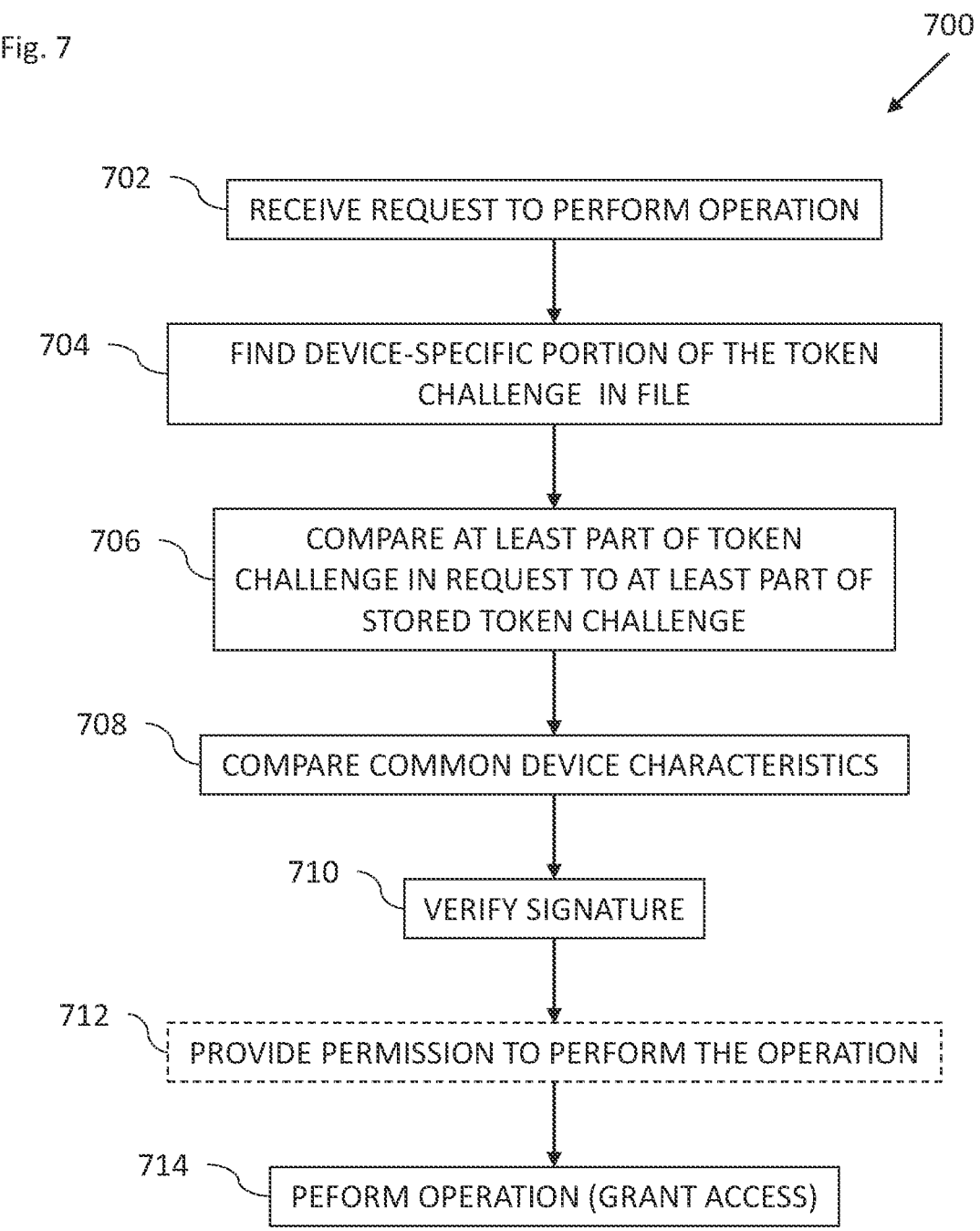

MULTI-DESTINATION CHALLENGE-RESPONSE SECURITY TOKENS

FIELD OF THE INVENTION

The present invention relates to compute systems, and in particular, but not exclusively to, device access security.

BACKGROUND

In computer security, challenge-response authentication is used to protect digital assets and services from unauthorized users, programs or activities. Challenge-response authentication may be simple, e.g., a password, or dynamic, e.g., a randomly generated request. Challenge-response authentication may include a question and a response. The challenge is used to require a response that is only known by authorized users. Therefore, a user that successfully answers the challenge is provided access to the protected asset or service, while other users are barred access to the asset or service.

SUMMARY

There is provided in accordance with an embodiment of the present disclosure, a secure challenge-response method, including requesting respective token challenges from devices, receiving the respective token challenges from the devices, providing the respective token challenges to a signing server, receiving from the signing server a signature of an aggregation of the respective token challenges signed with a private key of the signing server, and providing to a given device of the devices a request to perform an operation, the request including the signature and the respective token challenges.

Further in accordance with an embodiment of the present disclosure the operation includes granting access to the given device, the method further including receiving access to the given device.

Still further in accordance with an embodiment of the present disclosure, the method includes performing any one or more of the following responsively to the given device granting access debugging the given device, reconfiguring the given device, performing privileged operations on the given device, upgrading firmware of the given device.

Additionally in accordance with an embodiment of the present disclosure the providing the respective token challenges to the signing server includes providing to the signing server a file including the respective token challenges including respective device identifications, the receiving from the signing server includes receiving from the signing server the file including a signature of the respective token challenges signed with the private key of the signing server, and the providing to the given device includes providing to the given device the request to perform an operation, the request including the file including the respective token challenges and the signature.

Moreover, in accordance with an embodiment of the present disclosure the receiving from the signing server includes receiving from the signing server the file including the signature of the aggregation of the respective token challenges signed with the private key of the signing server.

Further in accordance with an embodiment of the present disclosure the file includes a common device characteristic of the devices.

Still further in accordance with an embodiment of the present disclosure the file includes at least one attribute of at least one privilege or operation to which the given device limits granting access to the holder of the file.

Additionally in accordance with an embodiment of the present disclosure, the method includes the signing server receiving the file from a requestor, and generating the signature of the aggregation of the respective token challenges signed with a private key, and providing to the requestor the signature.

Moreover, in accordance with an embodiment of the present disclosure, the method includes providing to the requestor the file including the respective token challenges and the signature.

Further in accordance with an embodiment of the present disclosure, the method includes the signing server embedding auxiliary information into the file.

Still further in accordance with an embodiment of the present disclosure, the method includes the given device receiving a token-challenge request from a requestor, generating a given token challenge, storing at least part of the given token challenge in a memory, providing to the requestor the given token challenge, receiving the request to perform the operation, verifying the signature included in the request responsively to a public key of the signing server and the given token challenge, and performing the operation responsively to authentication of the signature.

Additionally in accordance with an embodiment of the present disclosure, the method includes comparing at least part of the given token challenge included in the request to the at least part of the given token challenge stored in the memory.

Moreover, in accordance with an embodiment of the present disclosure, the method includes granting access to the given device responsively to the authentication of the signature.

Further in accordance with an embodiment of the present disclosure receiving the request to perform the operation includes receiving the request including a file including the respective token challenges including respective device identifications and the signature.

Still further in accordance with an embodiment of the present disclosure, the method includes the given device finding the given token challenge in the file responsively to a corresponding one of the respective device identifications, and comparing at least part of the given token challenge found in the file to the at least part of the given token challenge stored in the memory, and wherein the performing includes performing the operation responsively to the authentication of the signature, and the comparing providing a match between the at least part of the given token challenge included in the file and the at least part of the given token challenge stored in the memory.

Additionally in accordance with an embodiment of the present disclosure the file includes a common device characteristic of the devices, the method further including the given device comparing the common device characteristic to a characteristic of the given device, and wherein the performing includes performing the operation responsively to the characteristic of the given device matching the common device characteristic.

Moreover, in accordance with an embodiment of the present disclosure, the method includes randomly generating the nonce, and wherein the generating the given token challenge includes generating the given token challenge to include the generated nonce.

There is also provided in accordance with another embodiment of the present disclosure, a secure challenge-response method, including receiving a token-challenge request from a requestor, generating a given token challenge, storing at least part of the given token challenge in a memory, providing to the requestor the given token challenge, receiving a request to perform an operation, the request including a file including respective token challenges including the given token challenge, and respective device identifications, and a signature of an aggregation of the respective token challenges signed with a private key of a signing server, verifying the signature included in the request responsively to a public key of the signing server and the given token challenge, and performing the operation responsively to authentication of the signature.

Further in accordance with an embodiment of the present disclosure, the method includes comparing at least part of the given token challenge included in the request to the at least part of the given token challenge stored in the memory.

Still further in accordance with an embodiment of the present disclosure, the method includes granting access to a device responsively to the authentication of the signature.

Additionally in accordance with an embodiment of the present disclosure, the method includes finding the given token challenge in the file responsively to a corresponding one of the respective device identifications, comparing at least part the given token challenge found in the file to the at least part of the given token challenge stored in the memory, and wherein the performing includes performing the operation responsively to the authentication of the signature, and the comparing providing a match between the at least part of the given token challenge included in the file and the at least part of the given token challenge stored in the memory.

Moreover, in accordance with an embodiment of the present disclosure the file includes a common device characteristic of the devices, the method further including comparing the common device characteristic to a characteristic of a given device, and wherein the performing includes performing the operation responsively to the characteristic of the given device matching the common device characteristic.

Further in accordance with an embodiment of the present disclosure, the method includes randomly generating a nonce, and wherein the generating the given token challenge includes generating the given token challenge to include the generated nonce.

There is also provided in accordance with still another embodiment of the present disclosure, a secure device, including processing circuitry to receive a request to provide a given token challenge to a requestor, and generate the given token challenge, and a memory to store at least part of the given token challenge therein, and wherein the processing circuitry is to provide to the requestor the given token challenge, receive a request to perform an operation, the request including a file including respective token challenges including the given token challenge including respective device identifications, and a signature of an aggregation of the respective token challenges with a private key of a signing server, verify the signature included in the request responsively to a public key of the signing server and the given token challenge, and perform the operation responsively to authentication of the signature.

BRIEF DESCRIPTION OF THE DRAWINGS

The present invention will be understood from the following detailed description, taken in conjunction with the drawings in which:

FIG. 5 is a flowchart including steps in a first part of a method of operation of a device in the system of FIG. 1;

FIG. 6 is a flowchart including steps in a signing server in the system of FIG. 1; and FIG. 7 is a flowchart including steps in a second part of the method of FIG. 5.

DESCRIPTION OF EXAMPLE EMBODIMENTS

Overview

Figure 1:
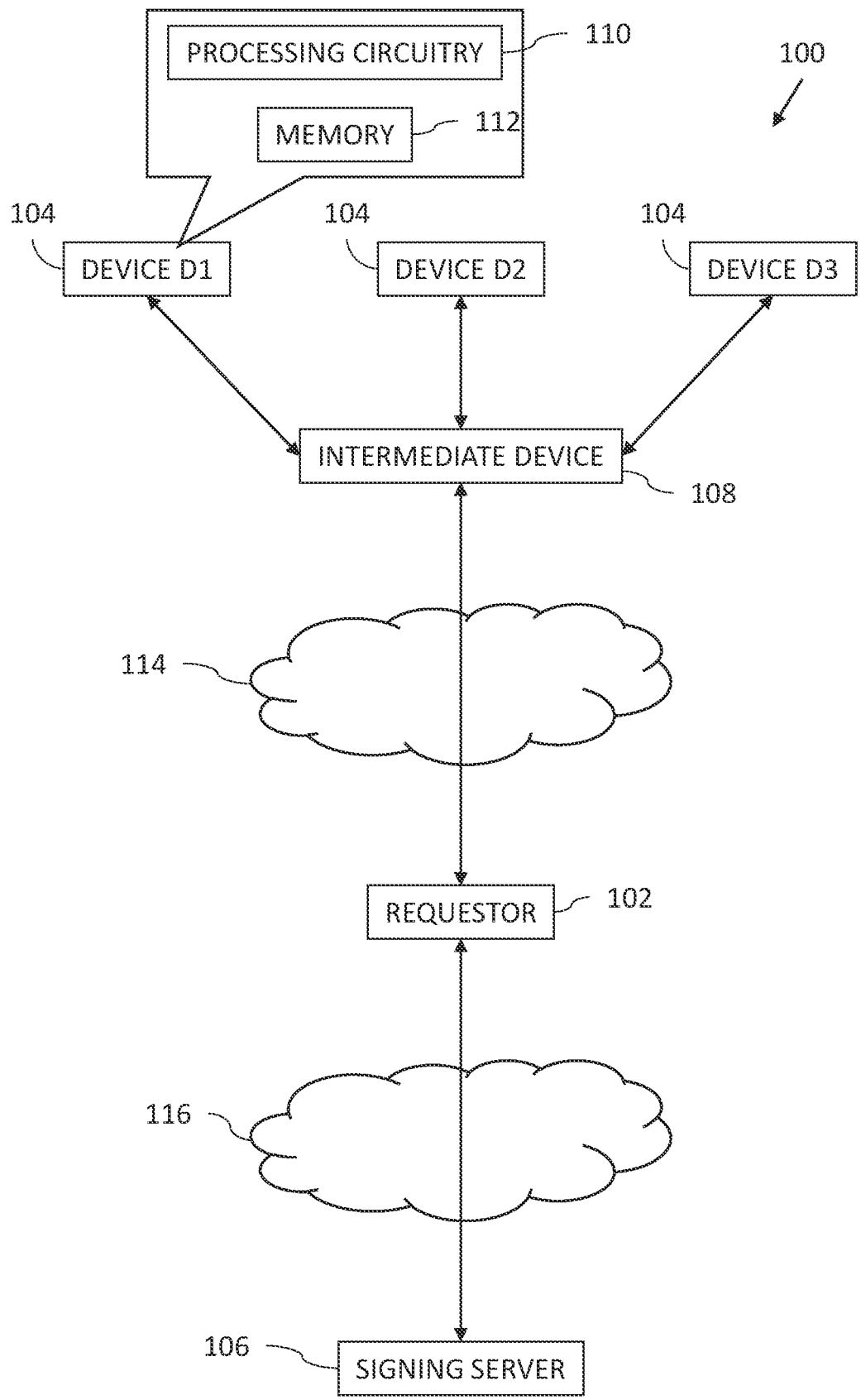
FIG. 1 is a secure challenge-response system constructed and operative in accordance with an embodiment of the present invention.

Device access security may be provided using a challenge-response mechanism. For example, a user may want to debug a secure device which enclaves itself and prevents any unsecure access into that device. In order to access the device, the user needs to provide credentials that prove that the user is a legitimate user to access the device (for a given operation or operations). The access to the device could be over peripheral component interconnect express (PCIe), Universal Serial Bus (USB), Ethernet, wireless, or via any suitable medium and via any suitable protocol. In some scenarios there may be no direct connection between the entity you want to access (e.g., a device) and the entity providing proof of your identity, thereby making providing secure access to the device even harder. For example, the user may want to access a secure device in a datacenter, while the device that needs to sign the proof of identity is elsewhere. In addition, the user typically wants to access multiple secure devices, for example, to debug those devices, and wants an efficient way to do so.

Embodiments of the present invention solve at least some of the above problems by providing a multi-destination challenge-response security token system in which a requestor (e.g., a user (or group of users) who want to be provided access to multiple devices or want the multiple devices to perform given operations) requests token challenges from the multiple devices. In response to the token challenge request, each device generates a token challenge (including a nonce randomly generated by that device and typically a device identification (ID) of that device), stores at least part of the generated token challenge (e.g., the nonce), and provides the token challenge to the requestor. The requestor receives the token challenges from the devices. In some embodiments, the requestor adds the received token challenges to a file. Data common to all the token challenges may be extracted from the token challenges by the requestor and added to the file as common data. The requestor provides the token challenges (optionally with other data and/or optionally in the file) to a signing server, which signs an aggregation of the token challenges (and optionally other data) as a group yielding a signature. The signature provides proof of identity and proves that the requestor is approved by the signing server to have access to, or request an operation from, the devices. In some embodiments, the token challenges and the signature (and optionally other data) are stored in the file. The requestor receives the signature, typically with the token challenges in the file. Other data may also be included in the file, such as an indication of a public key corresponding with a private key used to generate the signature (the indication of the public key is typically provided by the devices in the token challenge), and other data used to restrict or otherwise limit access of the requestor to the devices. For example, the requestor may be provided unlimited access to the devices by the signing server, or the requestor may be limited to performing certain functions, such as debugging or providing a given firmware update. The requestor may then request any one of the devices to perform an operation (such as provide access to the requestor to that device). The request includes the token challenges with the signature (e.g., in the file). The device compares its stored token challenge (or part thereof) to one of the token challenges sent with the request and verifies the signature using the public key of the signing server. The relevant token challenge may be found more easily (as well as provide greater security) if the token challenges listed in the file include the corresponding device IDs. If the stored token challenge matches one of the token challenges sent with the request, and the signature is successfully authenticated, the device may perform the operation (e.g., provide the requestor access to that device) and optionally send a permission acknowledgement to the requestor. The requestor may request an operation or operations from other ones of the devices using the token challenges (e.g., in the file) and the signature. In some embodiments, other checks may be performed by the device receiving the request based on data in the file to determine whether the operation should be performed and/or what level of access may be provided.

In some embodiments, each device may provide an operation only once using the generated token challenge. In some embodiments, the devices may delete (or otherwise mark) the stored token challenge in memory once the stored token challenge has been successfully used to provide an operation to the requestor thereby limiting use of the token challenge to one-time use thereby preventing replay attacks. The token challenge may include an expiry date and/or time by which the token challenge should be used with an accompanying operation request. The duration of the requested operation may be time limited.

In some embodiments, the devices may be queried by the requestor regarding the token challenge status (e.g., has a token challenge been provided, has the token challenge validation failed or succeeded, has the token challenge expired).

Using a file to store the token challenges and signature (and optionally other data) allows the approval process to be performed easily and via a variety of methods (e.g., including email or any other suitable messaging method). Using a single file for multiple devices allows the approval process (by the signing server) to be more efficient (e.g., approval for multiple devices is provided with one approval request), and allows the requestor to easily request that any one of the devices provide an operation by providing the file without having to search through multiple files or signatures relevant to that device.

System Description

Reference is now made to FIG. 1, which is a secure challenge-response system 100 constructed and operative in accordance with an embodiment of the present invention. The system 100 includes a requestor 102, devices 104, a signing server 106, and optionally an intermediate device 108. Each device 104 includes processing circuitry 110, and a memory 112. The requestor 102 requests token challenges from the devices 104, via a suitable medium and/or protocol, such as a network 114. Each device 104 generates a token challenge which is sent to the requestor 102. The requests and token challenges may be sent by any suitable medium and/or protocol, such as interconnect express (PCIe), Universal Serial Bus (USB), Ethernet, or wirelessly. In some embodiments, the requests and token challenges and other data may be transferred between the requestor 102 and the devices 104 via the intermediate device 108. The requestor 102 sends the token challenges and optionally other data (optionally included in a file) to the signing server 106, via any suitable medium and/or protocol, such as a network 116, interconnect express (PCIe), Universal Serial Bus (USB), Ethernet, wirelessly, email, or any suitable medium. Other processing of the signing server 106, requestor 102, and the devices 104 as well as the data transferred between the various elements of the system 100 are described in more detail with reference to FIGS. 2-7.

The devices 104 and the intermediate device 108 may be any suitable devices. For example, the intermediate device 108 may be a switch and the devices 104 cable modules of the switch. Communication between the requestor 102 and the intermediate device 108 and/or the devices 104 may be via any suitable communication protocol such as Application Programming Interfaces (APIs), while communication between the requestor 102 and the signing server 106 may be via any suitable protocol or method, such as APIs of the signing server or via email.

In practice, some or all of the functions of the processing circuitry 110 of the devices 104, the requestor 102, the intermediate device 108, and the signing server 106 may be combined in a single physical component (e.g., processor) or, alternatively, implemented using multiple physical components (e.g., processors). These physical components may comprise hard-wired or programmable devices, or a combination of the two. In some embodiments, at least some of the functions may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
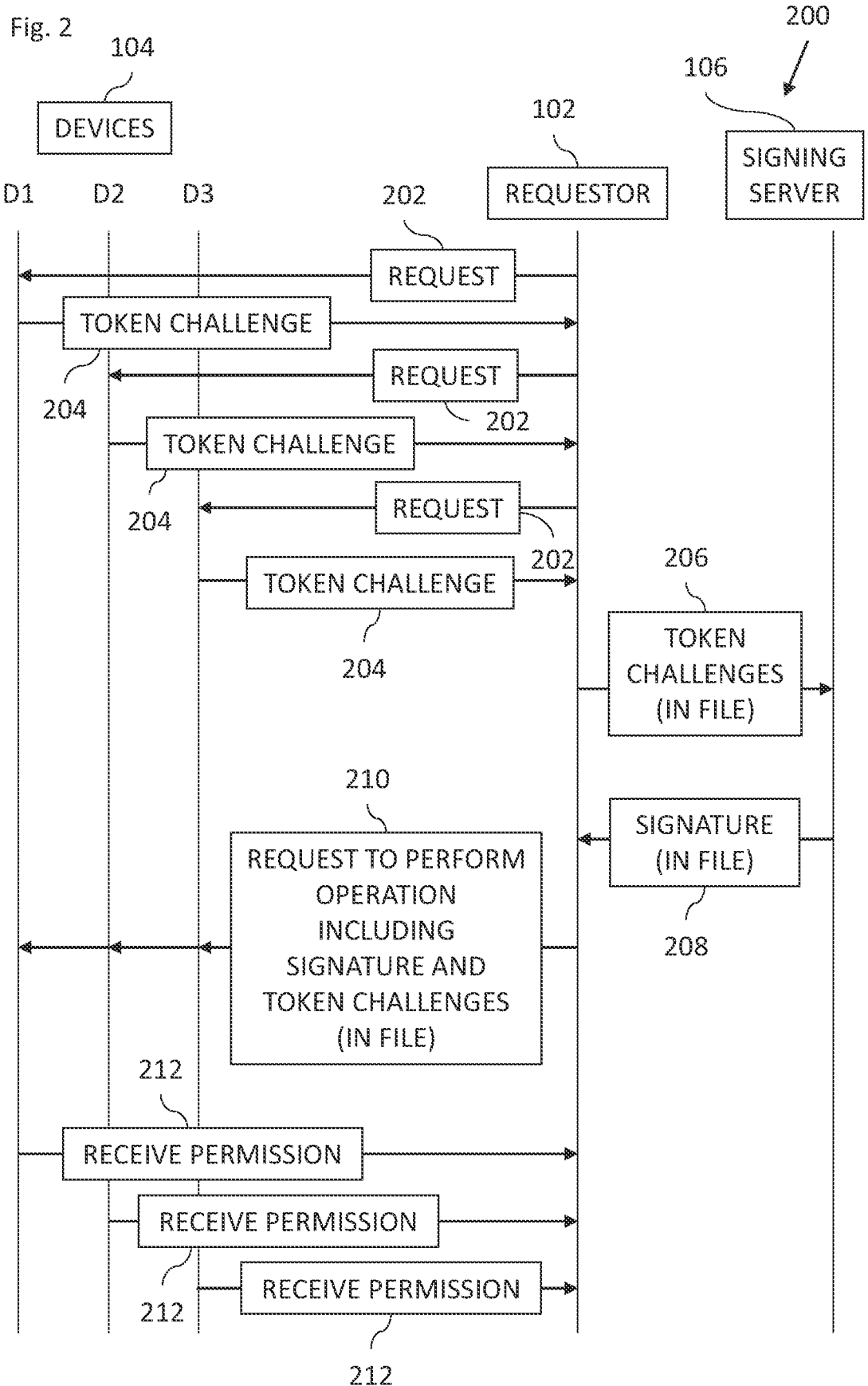
FIG. 2 is a data flow diagram showing flow of data in a method of operation of the system of FIG. 1.

Reference is now made to FIG. 2, which is a data flow diagram 200 showing flow of data in a method of operation of the system 100 of FIG. 1.

The requestor 102 sends (optionally via the intermediate device 108) a request 202 to each device 104 (e.g., device D1, D2 and D3, from which the requestor 102 wants to receive a token challenge 204). Each device generates its token challenge 204, and sends the generated token challenge 204 to the requestor 102 (optionally via the intermediate device 108). The requestor 102 sends the received token challenges 204 together (optionally in a file with other data) (block 206) to the signing server 106. The signing server 106 signs an aggregation of the token challenges 204 and other data (described in more detail with reference to FIG. 6) yielding a signature. The signing server 106 sends the signature and optionally other data (optionally in the file) (block 208) to the requestor 102. The requestor 102 may send a request 210 (including the signature and other data) to any one or more of the devices 104 to perform an operation such as providing the requestor 102 with access to the device(s) 104. The requestor 102 may optionally receive permission 212 via an acknowledgement from the requested devices 104. The steps described above with reference to FIG. 2 are now described with more detail with reference to FIGS. 3-7.

Figure 3:
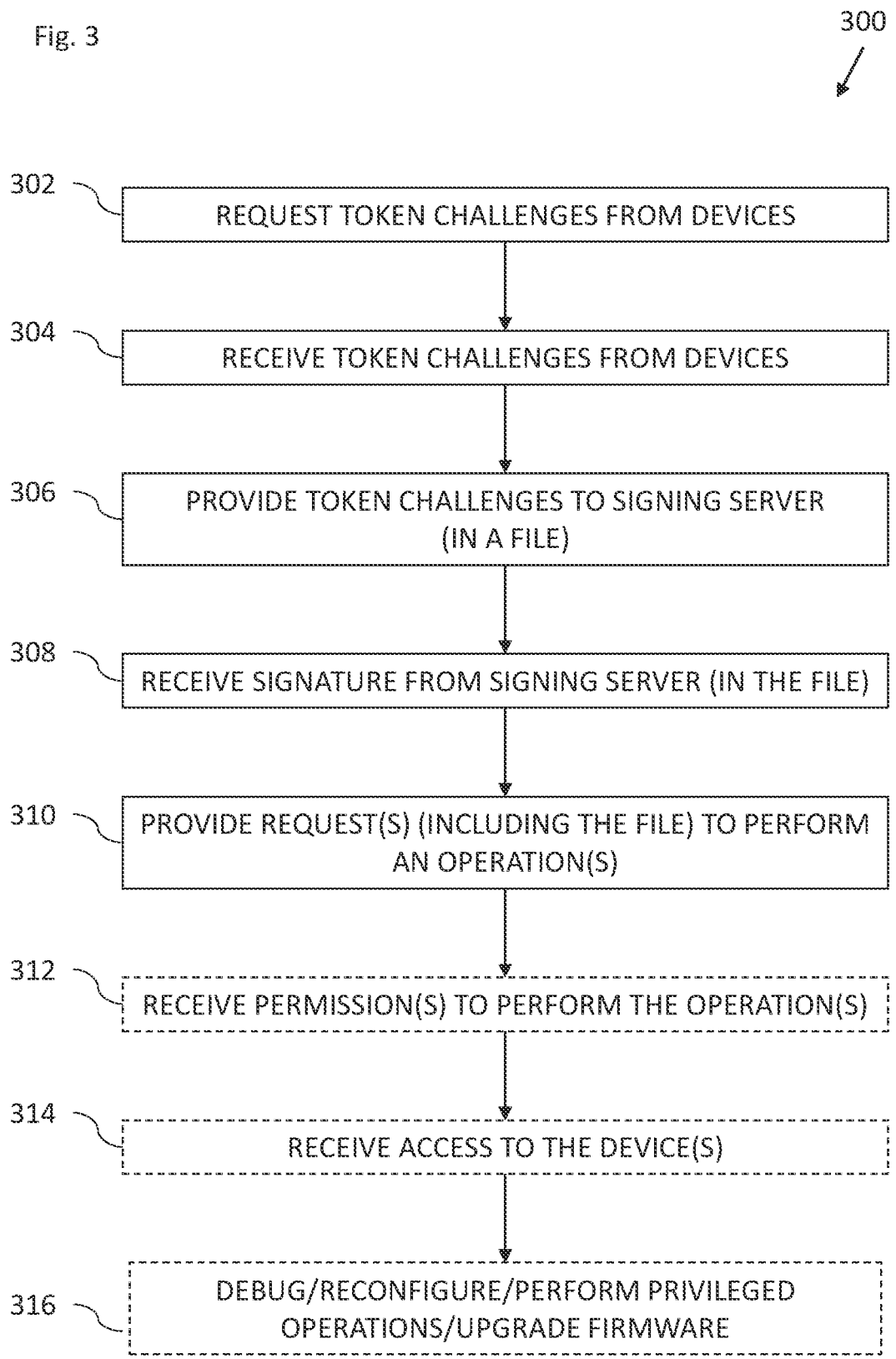
FIG. 3 is a flowchart including steps in a method of operation of a requestor in the system of FIG. 1.

Reference is now made to FIG. 3, which is a flowchart 300 including steps in a method of operation of the requestor 102 in the system 100 of FIG. 1. The requestor 102 is configured to request respective token challenges 204 from devices 104 (block 302). The requestor 102 is configured to receive the token challenges 204 from the devices 104 (block 304). The requestor 102 is configured to provide the token challenges to the signing server 106 (block 306). In some embodiments, the requestor 102 is configured to provide to the signing server 106 a file including the token challenges 204 (including respective device identifications of the token challenges). For example, the token challenge of device D1 is identifiable as being generated by device D1 based on the device ID included in the file. The file is described in more detail with reference to FIG. 4.

The requestor 102 is configured to receive from the signing server 106 a signature of the token challenges (and optionally of other data, such as data included with the token challenges (in the file)), signed with a private key of the signing server 106 (block 308). In some embodiments, the requestor 102 is configured to receive from the signing server 106 the signature included in the file. In some embodiments, the signature signs an aggregation of the respective token challenges (including the respective device identifications) with the private key of the signing server 106. The file may include at least one attribute of at least one privilege or operation to which the given device limits granting access to the holder of the file (for example, to grant access to upgrade only if device has version X installed). The file may include a common device characteristic of the devices 104 added to the file by the requestor 102 or the signing server 106.

The requestor 102 is configured to provide to a given one or more of the devices 104 (optionally via the intermediate device 108) a request to perform an operation (or operations) (block 310). The request may include the signature, the respective token challenges and other data including data included in the file, described with reference to FIG. 4. In some embodiments, the request provided the given device(s) to perform the operation(s) includes the file, which includes the token challenges, the signature, and optionally other data as described in more detail with reference to FIG. 4. In some embodiments, the requestor 102 is configured to receive respective permissions from the devices 104 to perform the operation(s) (block 312).

In some embodiments, the operation includes granting access to the given device(s) 104 (by the given device(s) 104). The requestor 102 may be configured to receive access to the given device(s) (block 314). In some embodiments, the requestor 102 is configured to perform any one or more of the following responsively to the given device granting access: debug the given device; reconfigure the given device; perform privileged operations on the given device; and upgrade firmware of the given device (block 316).

Figure 4:
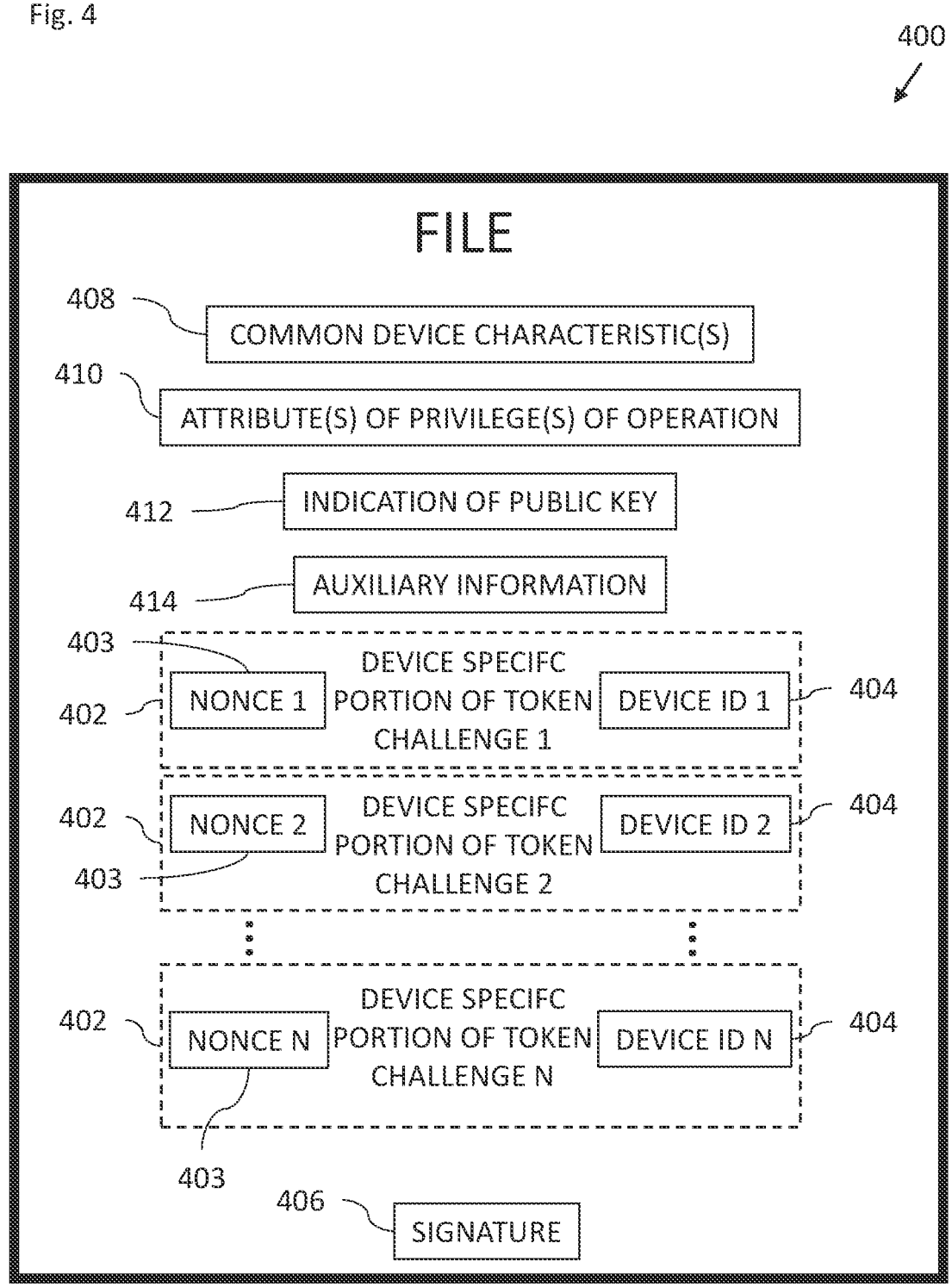
FIG. 4 is a schematic view of a file for use in the system of FIG. 1.

Reference is now made to FIG. 4, which is a schematic view of a file 400 for use in the system 100 of FIG. 1. The file 400 is generated by the requestor 102, which adds device-specific portions of the token challenges 402 (including respective nonces 403 and corresponding device IDs 404 and optionally part numbers and/or firmware versions etc.) to the file 400. Other non-device specific data (described in more detail below) common to all the token challenges (such as an indication 412 of the public key corresponding to a private key to be used to generate a signature 406) may be extracted from the token challenges and included once in the file 400. The signing server 106 adds the signature 406 to the file 400. The signature 406 may be generated using any of the data of the file 400 as received by the signing server 106 from the requestor 102 and optionally based on data added to the file 400 by the signing server 106 such as auxiliary information described below and based on the indication 412 of the public key.

The requestor 102 may add any one or more of the following to the file: common device characteristics 408 (e.g., device type, device function, device class); attribute(s) of privilege(s) of operation 410 (e.g., debug, full access, partial access, access for a limited time period, access for updating a given firmware version, access if a given firmware version is installed); and an indication 412 of the public key of the signing server 106 corresponding to the private key used to generate the signature 406. The private key and the public key of the signing server 106 form a public-key cryptography key pair. The signing server 106 may add auxiliary information 414 (e.g., which user requested the signing server 106 to generate the signature, a handle of the signature 406, and/or a time stamp of when the signature was generated by the signing server 106).

Reference is now made to FIG. 5, which is a flowchart 500 including steps in a first part of a method of operation of one of the devices 104 in the system 100 of FIG. 1. The processing circuitry 110 of the device 104 is configured to receive a token-challenge request from the requestor 102 to provide a given token challenge to the requestor (block 502). In some embodiments, the processing circuitry 110 of the device 104 is configured to generate a random nonce (which may be a true-random or pseudo-random nonce) (block 504). The processing circuitry 110 of the device 104 is configured to generate the given token challenge. In some embodiments, the processing circuitry 110 of the device 104 is configured to generate the given token challenge to include the generated random nonce (block 506). The processing circuitry 110 of the device 104 is configured to store the given token challenge in the memory 112 (block 508). The processing circuitry 110 of the device 104 is configured to provide the given token challenge to the requestor 102 (block 510).

Reference is now made to FIG. 6, which is a flowchart 600 including steps in a signing server for use in the system of FIG. 1.

The signing server 106 is configured to receive the token-challenges from the requestor 102 (block 602). In some embodiments, the signing server 106 is configured to receive the file 400 (including the device-specific portions of the token-challenges 402, common device characteristics 408, attribute(s) of privilege(s) of operation 410, the indication 412) from the requestor 102. The signing server 106 is configured (based on the indication 412 of the public key) to generate the signature 406 of an aggregation of the respective device-specific portions of the token challenges 402 (and optionally one or more of the following: common device characteristics 408, attribute(s) of privilege(s) of operation 410, the indication 412, the auxiliary information 414 added by the signing server 106) signed with the private key of the signing server 106 (block 604). The signing server 106 is configured to insert the signature 406 in the file 400 (block 606). The signing server 106 is configured to embed the auxiliary information 414 into the file 400 (block 608). The step of block 608 may be performed prior to the step of block 604. The signing server 106 is configured to provide to the requestor 102 the file 400 including the device-specific portions of the token-challenges 402, the signature 406, the common device characteristics 408, the attribute(s) of privilege(s) of operation 410, the indication 412, and the auxiliary information 414 (block 610). In some embodiments, the signing server 106 provides the signature 406 to the requestor 102 without providing the file 400.

Reference is now made to FIG. 7, which is a flowchart 700 including steps in a second part of the method of FIG. 5.

The processing circuitry 110 of one of the devices 104 is configured to receive a request from the requestor 102 to perform an operation (block 702). The request may include the file 400 including the device-specific portions of the token challenges 402, the signature 406 and other data described in more detail with reference to FIG. 4. The processing circuitry 110 is configured to find the device-specific portion of the relevant token challenge in the file 400 (i.e., the token challenge previously generated by this device 104) responsively to the corresponding device ID 404 in the device-specific portion of the relevant token challenge in the file 400 (block 704). The processing circuitry 110 is configured to compare at least part (e.g., the nonce) of the device-specific portion of the relevant token challenge (and other data) included (in the file 400) in the request to at least part (e.g., the nonce) of the token challenge stored in the memory 112 (block 706).

In some cases, the file 400 may include different types of devices. It may occur that one device of one type (e.g., type A) could have same device ID (e.g., serial number) as a device from another type (e.g., type B) leading to confusion among devices just based on device ID alone. Therefore, in such a case it may be important to compare common characteristics of this device with the common device characteristics 408 associated with the device-specific portion of the relevant token challenge 402 and device ID 404 to ensure that the correct device is being addressed by the requestor 102. Therefore, in some embodiments, the processing circuitry 110 is configured to compare the common device characteristic(s) 408 included in the file 400 to a characteristic of this device 104 (block 708).

The processing circuitry 110 is configured to verify the signature 406 included in the request responsively to the public key of the signing server 106 and the data included in the file 400 (which includes the device-specific portion of the relevant token challenge 402 among the device-specific portion other token challenges 402) (block 710). Assuming the signature is successfully authenticated, and the comparing steps yield matches, the processing circuitry 110 is optionally configured to provide permission to the requestor 102 to perform the requested operation(s) (block 712).

The processing circuitry 110 is configured to perform the operation (block 714) responsively to: authentication of the signature 406; and optionally the comparing providing a match between the (part of the) device-specific portion of the relevant token challenge 402 (and other data) included in the file 400 and the (part of the) token challenge stored in the memory 112; and/or the characteristic of this device 104 matching the common device characteristic(s) 408 in the file 400.

In some embodiments, the processing circuitry 110 is configured to grant access to this device 104 responsively to the authentication of the signature and optionally based on the comparing providing a match, and any other suitable factor or factors.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A secure challenge-response method, comprising:
requesting respective token challenges from devices;
receiving the respective token challenges from the devices;
providing the respective token challenges to a signing server;
receiving from the signing server a signature of an aggregation of the respective token challenges signed with a private key of the signing server; and
providing to a given device of the devices a request to perform an operation, the request including the respective token challenges and the signature of the aggregation of the respective token challenges.

2. The method according to claim 1, wherein the operation includes granting access to the given device, the method further comprising receiving access to the given device.

3. The method according to claim 2, further comprising performing any one or more of the following responsively to the given device granting access: debugging the given device; reconfiguring the given device, performing privileged operations on the given device, upgrading firmware of the given device.

4. The method according to claim 1, wherein:
the providing the respective token challenges to the signing server includes providing to the signing server a file including the respective token challenges including respective device identifications;
the receiving from the signing server includes receiving from the signing server the file including a signature of the respective token challenges signed with the private key of the signing server; and
the providing to the given device includes providing to the given device the request to perform an operation, the request including the file including the respective token challenges and the signature.

5. The method according to claim 4, wherein the receiving from the signing server includes receiving from the signing server the file including the signature of the aggregation of the respective token challenges signed with the private key of the signing server.

6. The method according to claim 4, wherein the file includes a common device characteristic of the devices.

7. The method according to claim 4, wherein the file includes at least one attribute of at least one privilege or operation to which the given device limits granting access to the holder of the file.

8. The method according to claim 4, further comprising the signing server:
receiving the file from a requestor;
generating the signature of the aggregation of the respective token challenges signed with a private key; and
providing to the requestor the signature.

9. The method according to claim 8, further comprising providing to the requestor the file including the respective token challenges and the signature.

10. The method according to claim 8, further comprising the signing server embedding auxiliary information into the file.

11. The method according to claim 1, further comprising the given device:
receiving a token-challenge request from a requestor;
generating a given token challenge;
storing at least part of the given token challenge in a memory;
providing to the requestor the given token challenge;
receiving the request to perform the operation;
verifying the signature included in the request responsively to a public key of the signing server and the given token challenge; and
performing the operation responsively to authentication of the signature.

12. The method according to claim 11, further comprising comparing at least part of the given token challenge included in the request to the at least part of the given token challenge stored in the memory.

13. The method according to claim 11, further comprising granting access to the given device responsively to the authentication of the signature.

14. The method according to claim 11, wherein receiving the request to perform the operation includes receiving the request including a file including the respective token challenges including respective device identifications and the signature.

15. The method according to claim 14, further comprising the given device:
finding the given token challenge in the file responsively to a corresponding one of the respective device identifications; and
comparing at least part of the given token challenge found in the file to the at least part of the given token challenge stored in the memory, and wherein the performing includes performing the operation responsively to: the authentication of the signature; and the comparing providing a match between the at least part of the given token challenge included in the file and the at least part of the given token challenge stored in the memory.

16. The method according to claim 15, wherein the file includes a common device characteristic of the devices, the method further comprising the given device comparing the common device characteristic to a characteristic of the given device, and wherein the performing includes performing the operation responsively to the characteristic of the given device matching the common device characteristic.

17. The method according to claim 11, further comprising randomly generating the nonce, and wherein the generating the given token challenge includes generating the given token challenge to include the generated nonce.

18. A secure challenge-response method, comprising:
receiving a token-challenge request from a requestor;
generating a given token challenge;
storing at least part of the given token challenge in a memory;
providing to the requestor the given token challenge;
receiving a request to perform an operation, the request including a file including respective token challenges comprising: the given token challenge; and respective device identifications, and a signature of an aggregation of the respective token challenges signed with a private key of a signing server;
verifying the signature included in the request responsively to a public key of the signing server and the given token challenge; and
performing the operation responsively to authentication of the signature.

19. The method according to claim 18, further comprising comparing at least part of the given token challenge included in the request to the at least part of the given token challenge stored in the memory.

20. The method according to claim 18, further comprising granting access to a device responsively to the authentication of the signature.

21. The method according to claim 18, further comprising:
finding the given token challenge in the file responsively to a corresponding one of the respective device identifications;
comparing at least part the given token challenge found in the file to the at least part of the given token challenge stored in the memory, and wherein the performing includes performing the operation responsively to: the authentication of the signature; and the comparing providing a match between the at least part of the given token challenge included in the file and the at least part of the given token challenge stored in the memory.

22. The method according to claim 21, wherein the file includes a common device characteristic of the devices, the method further comprising comparing the common device characteristic to a characteristic of a given device, and wherein the performing includes performing the operation responsively to the characteristic of the given device matching the common device characteristic.

23. The method according to claim 18, further comprising randomly generating a nonce, and wherein the generating the given token challenge includes generating the given token challenge to include the generated nonce.

24. A secure device, comprising:
processing circuitry to: receive a request to provide a given token challenge to a requestor; and generate the given token challenge; and
a memory to store at least part of the given token challenge therein, and wherein the processing circuitry is to:
provide to the requestor the given token challenge;
receive a request to perform an operation, the request including a file including respective token challenges comprising the given token challenge including respective device identifications, and a signature of an aggregation of the respective token challenges with a private key of a signing server;
verify the signature included in the request responsively to a public key of the signing server and the given token challenge; and
perform the operation responsively to authentication of the signature.

* * * * *